Sept. 16, 1958 M. F. CHUBB ET AL 2,852,593
ELECTROLYTIC BATTERY ASSEMBLY
Filed May 13, 1955 3 Sheets-Sheet 1
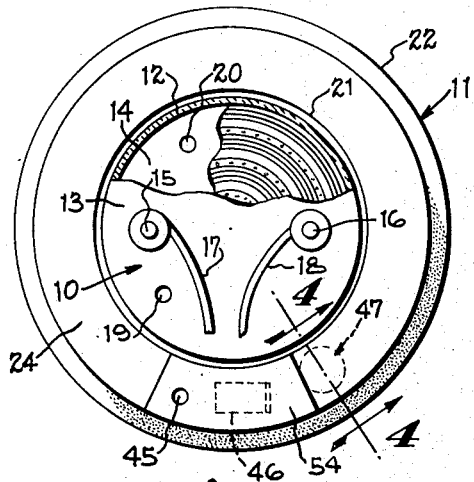
Fig. 1
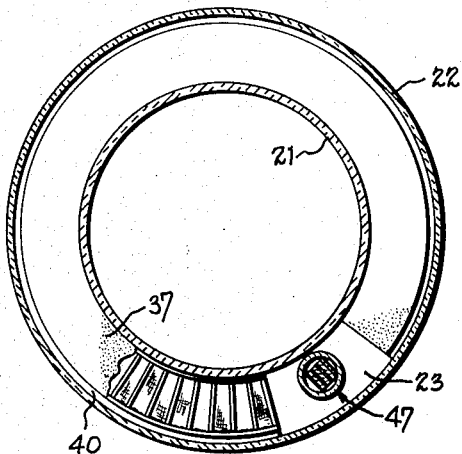
Fig. 3
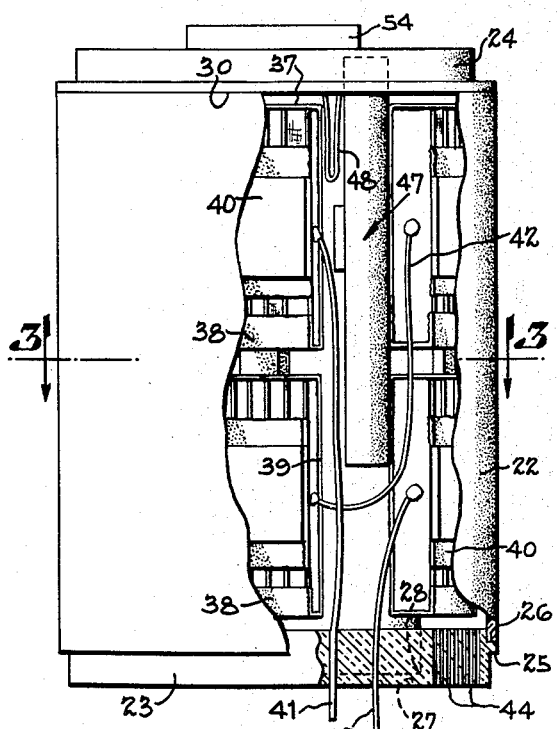
Fig. 2
Fig. 4
Fig. 5
INVENTORS.
Melvin F. Chubb.
BY James M. Hines.
Wood, Herron & Evans.
ATTORNEYS.

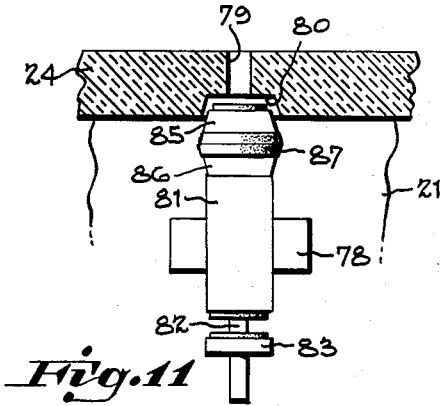
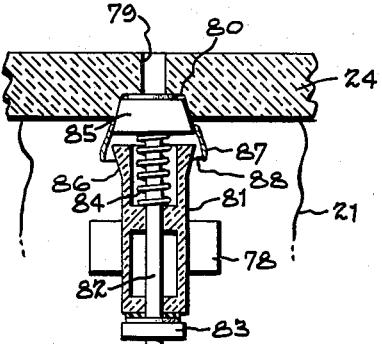
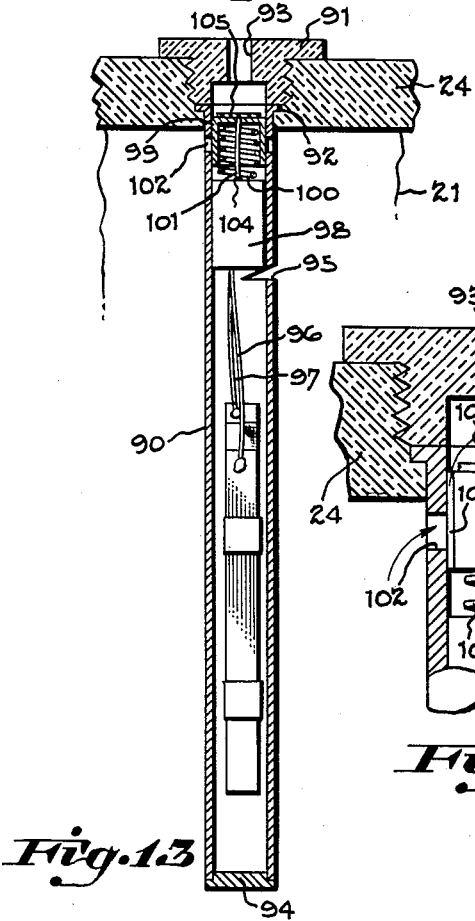
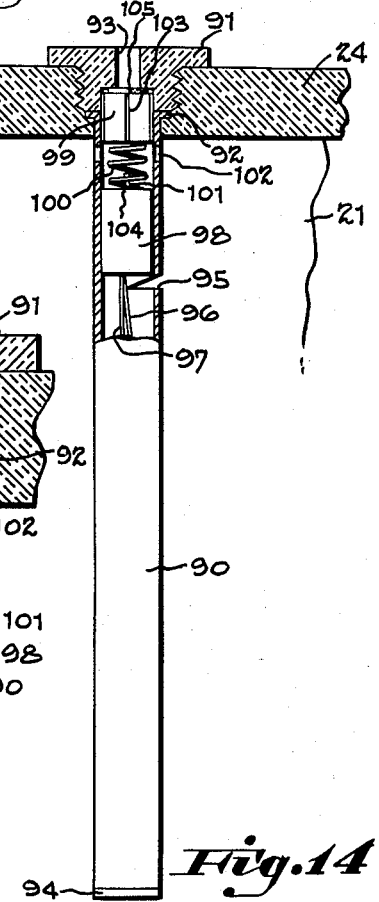

United States Patent Office 2,852,593
Patented Sept. 16, 1958

2,852,593

ELECTROLYTIC BATTERY ASSEMBLY

Melvin F. Chubb and James M. Dines, Joplin, Mo., assignors to The Eagle-Picher Company, Cincinnati, Ohio, a corporation of Ohio Application May 13, 1955, Serial No. 508,206

18 Claims. (Cl. 136—91)

This invention relates to an improved unitary battery assembly which is adapted to provide high and low voltage electrical energies of the type commonly required for operation of electronic signaling equipment and the like. The batteries of the present invention are of the submersible type, so constructed as to be activated by immersion in fresh or salt water.

Electronic equipment usually requires low voltage, high amperage current, designated A, for the energization of certain circuit components in conjunction with high voltage, low amperage current, designated B, for the operation of other circuit components. For these respective services, the battery assemblies of the present invention include multiple cells appropriately interconnected in parallel and in series in the usual manner, the cells individually comprising couples of any suitable type adapted for activation by water.

In the preferred construction of this invention, the couples are of the magnesium-cuprous chloride type, the electrodes being spaced by bibulous pads which absorb and hold the electrolyte. A suitable cell for A battery service is shown in the copending U. S. application Serial No. 285,920, filed May 3, 1952, while a suitable cell assembly for B battery service is disclosed in my U. S. Patent No. 2,684,481, issued July 20, 1954, for "Method of Making Electric Batteries." However, the objective of this invention has been to provide a completely submersible assembly of an A battery and a B battery which is self-regulating and which, without further attention or manipulation, will respond reliably upon being immersed in very cold water such as exists in the Arctic areas, or in the warm, equatorial waters. The temperature variations between these extremes pose severe problems of battery operation and capacity which this invention overcomes.

The typical A battery is constituted by a single cell having extended electrode surfaces or a number of such cells connected in parallel. A B battery, on the other hand, is constituted by a multiplicity of series-connected cells, each cell having relatively small electrode surface areas in comparison with that of an A battery. It is well known that electrochemical reaction within the cells of either type increases with a rise in temperature, and also that the multiplicity of B battery cells, during discharge, generates far more heat than that generated in the A battery. These characteristics are particularly true with respect to magnesium-cuprous chloride couples. Conversely, low temperatures impair battery performance, both in respect to the promptness of response to activation and in respect to overall capacity. Hence, if an A battery alone is immersed in Arctic water, it yields less current than it was designed to yield in normal operation; whereas, a B battery immersed in tropical water is likely to over-heat, boil off the activating electrolyte, and fail. Thus, since over-heating is the hazard of a B battery unit, and since under-heating, or low discharge, is the hazard of an A battery, it has been difficult to provide an assembly of the two which is small in size and low in weight, and in which the performance characteristics of the two different types of batteries are not adversely affected. It is also requisite, of course, that batteries intended for service of the type contemplated by the present invention shall be at least approximately matched as to the length of time during which they will continue to discharge after activation.

In accordance with this invention, minimum volumetric and weight requirements are provided in conjunction with satisfactory performance characteristics by a construction wherein the A battery is surrounded by the B battery, in compact relationship thereto, whereby the B battery constitutes a thermal heater for the A battery, yet constitutes its own radiation to prevent over-heating. Therefore, in Arctic service the A battery derives heat from the B battery such that its electrode area may be less than that which would otherwise be required to deliver a given discharge current at the prevailing low temperature of the activating water. On the other hand, in tropical service where the water is warm, the B battery, constituting the outermost layer of the assembly, exposes the greatest surface area to cooling by the water, and over-heating of the B battery is prevented notwithstanding the prevailing adverse water temperature. By this arrangement, a unitary, combined battery structure is provided which operates efficiently and reliably in bodies of water of widely varying temperature, whether the water be sea water or fresh water.

The assembly of cells constituting the B battery generates a high voltage through the series cell interconnections. This voltage exists not only at the terminals, but within the assembly and may typically be as much as 100 to 300 volts, depending upon the battery design as governed by the requirements of the electronic apparatus which the battery is intended to energize. Each cell comprises a bibulous pad which absorbs the water electrolyte and disposes it in electrochemical relation to the electrodes. The battery becomes activated when the pads are caused to absorb water by immersion in an electrolyte. For this purpose, the bibulous pads of the individual cells are exposed at one or more of their edges, the absorption of electrolyte proceeding through the pads by capillarity. So-called "dunk" type batteries heretofore have been proposed and used in which cell activation is accomplished by submerging the entire assembly in a body of water so as to allow the bibulous pads to absorb as much water as they will, after which the assembly is removed from the body of water and placed in use. In previous constructions a predetermined volume of water is poured, without excess, onto the pads. However, the present invention contemplates batteries which will respond satisfactorily when they are merely dumped into water and left there, floating or submerged, without further attention or manipulation. In such event, the open exposure of one or more of the edges of each cell to permit ingress of water for activation establishes a condition conductive to high voltage short-circuiting of the cells about their exposed edges and through the electrolyte. The problem, therefore, has been to admit sufficient water to the cell assembly to satisfy the electrochemical requirements, but to prevent complete surrounding of the cells by excess water through which short-circuiting and premature discharge would ensue.

Batteries, particularly B batteries, of the present invention comprise a generally air-tight casing within which a plurality of series-connected cells is contained. This casing is provided with one or more water inlet openings and an air outlet opening. When the unit is dumped into the water, water enters through the inlet and the air within the casing escapes through the outlet, thereby permitting the casing to be filled with water sufficient to satisfy the absorption capacity of the bibulous pads of the cells. However, the batteries of the present invention are additionally provided with a normally open water-activated valve which is operable to close off the air outlet of the casing when an adequate volume of activating water has entered the casing. In consequence of activation of the battery, the cells through electrochemical action begin to liberate gas (such as hydrogen when the couple is magnesium cuprous chloride). The gas becomes trapped within the casing and accumulates to develop sufficient pressure to expel excess water back through the inlet whence it entered, but the gas, of course, is incapable of expelling absorbed water from the bibulous pads. Therefore, the battery operates upon the electrolyte which remains in the bibulous pads, while the excess water which would otherwise be surrounding the cells to cause short circuiting at their edgewise portions is expelled, and the possibility of intercell short circuiting around the edges thereof is prevented. In this manner, the insulation requirements to accommodate high voltage are minimized, and the volumetric size of the assembly of series connected cells is reduced.

The accompanying drawings illustrate the principles of construction which have just been described, plus other features and advantages which are discussed at later points.

In the drawings:

Figure 1 is a top plan view of a battery assembly incorporating the principles of the present invention. In this view certain of the parts are broken away to illustrate details of construction.

Figure 2 is a side elevational view of the assembly of Figure 1 in which part of the battery casing is broken away and the bottom of the casing is shown in section to illustrate construction details.

Figure 3 is a fragmentary cross sectional view taken on the line 3—3 of Figure 2.

Figure 4 is a fragmentary cross sectional view taken on the line 4—4 of Figure 1 showing a water activated trigger battery which may be used to activate the vent closing device employed in the B battery.

Figure 5 is an exploded view of the electrodes of the trigger battery of Figure 4.

Figure 11 shows another modification of a vent closing device, the device itself being shown in side elevation.

Figure 12 is a cross sectional view of the vent closing device of Figure 11.

Figure 13 shows an additional modification of a vent closing device.

Figure 14 shows the device of Figure 13 in closed condition.

Figure 15 is an enlarged fragmentary cross sectional view of the upper part of the vent closing device illustrated in Figure 13 showing the way in which air escapes through the vent prior to the time the device is activated.

Figure 6:
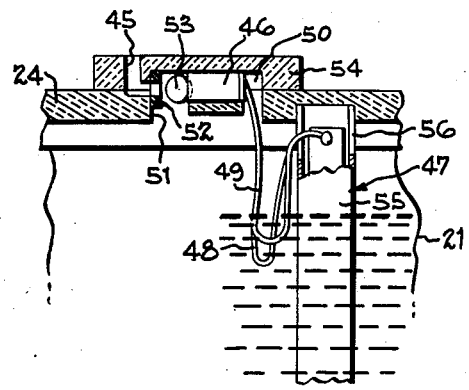
Figure 6 is a fragmentary cross sectional view illustrating the preferred form of vent closing device ready to be activated by the trigger battery.
Figure 7:
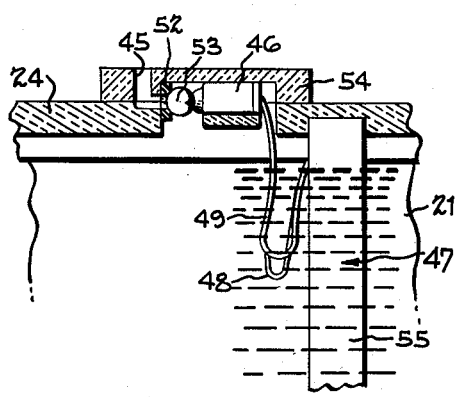
Figure 7 is a view similar to Figure 6 in which the vent closing device is shown after activation.

As shown in Figure 1 of the drawings the assembly of this invention consists essentially of an A battery indicated generally at 10, and a B battery indicated generally at 11. The cell (or cells) of A battery 10 is housed within a cylindrical casing; whereas the cells comprising the B battery are housed within a casing which is in the shape of a hollow cylinder of a size to enclose and embrace the A battery. The case of inner battery A consists essentially of a cylindrical wall 12 which is closed at its top and bottom respectively by disks 13 and 14. These structural members of battery A may be fabricated of plastic, hard rubber or other known non-conductive material.

A low voltage, high amperage current is generated by battery A. For this purpose the battery may enclose a large single cell or a number of individual cells which are connected electrically in parallel. The cell or cells of the battery may be constructed in accordance with the teaching of copending application Serial No. 285,920. A single cell for battery A may consist of a pasted cuprous chloride positive electrode, a magnesium negative electrode, and a bibulous pad which is sandwiched between the two electrodes for holding aqueous electrolyte. The laminated cell material may be rolled up to fit into the A battery casing. Or, as shown in the drawings, the A battery may consist of three cells, each consisting of a positive electrode, a negative electrode and a bibulous pad sandwiched between the two with the individual cells arranged concentrically to fit into the cylindrical casing of the battery. However, the A battery may be of any desired construction having the life and current generating characteristics required by the electronic equipment which the assembly is to power. Thus, no detailed disclosure of the battery is included.

Two terminals 15 and 16 are provided for battery A, these terminals being connected to lead wires 17 and 18 respectively. As disclosed in the copending application to which reference has been made, the cells of battery A are activated upon the admission of water into the casing. The water electrolyte enters through a hole 20 in the disk 14 and air is permitted to escape through a vent 19 in the disk 13 as the level of the water rises inside of the battery compartment. Since the A battery has a limited number of cells it does not tend to short circuit unduly through the electrolyte, and thus no provision need be made to limit the amount of electrolyte present within the casing.

The casing of battery B may consist of inner and outer cylindrical walls designated 21 and 22 respectively which are joined together by means of an annular bottom plug 23 and an annular top plug 24. The annular plug 23 at the bottom of the B battery includes a circumferential flange 25 which, with the side of the plug above flange 25, provides a seat 26 to receive the lower rim of the outer cylinder 22. Water proof adhesive, an appropriate plastic solvent or other means may be employed to seal the juncture at seat 26. The inside of the lower plug also has a flange, indicated at 27 in this instance, which defines with the inner side of the plug above flange 27 a seat 28 configurated to receive the lower rim of the inner cylindrical wall 21. Seat 28 also is sealed so as to be water tight. Substantially the same type of construction is employed at the upper end with inner and outer seats 29 and 30 being provided on the respective sides of plug 24 to receive the upper rims of the inner and outer cylindrical walls 21 and 22. These junctures also are sealed so as to be water tight.

Figure 10:
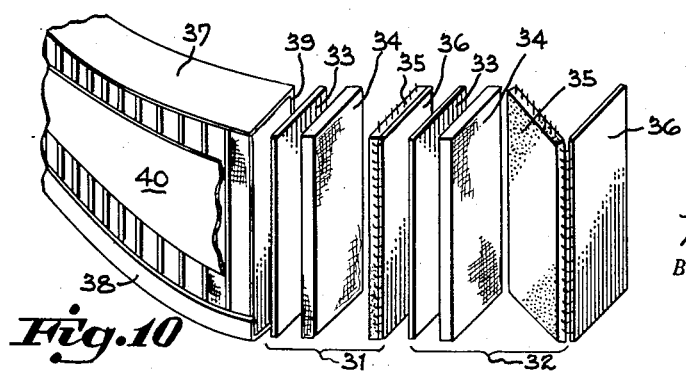
Figure 10 is an exploded view, in perspective, illustrating the construction of the cell components of the B battery.

The cells of the B battery are of the type disclosed in the patent hereinbefore identified. The individual, rectangular lamina comprising two adjacent cells are best illustrated in the exploded view of Figure 10. The components of two cells are each enclosed with brackets, designated 31 and 32 respectively in this figure. In going from left to right, each cell comprises a plate 33 of magnesium which constitutes the negative electrode, a bibulous pad 34, a pasted cuprous chloride positive electrode 35, and a copper cell divider 36. In the B battery these elements are held together in pressure contact by layers of plastisol applied to the edges of the electrodes and the associated sheets at the top 37, bottom 38 and inner edges as at 39, there being a center strip 40 on the outside edges of the electrodes and associated sheets. The technique of fabricating this type of battery structure is described in Patent No. 2,648,481. In the present instance, the B battery utilizes two cell piles which are located one above the other and which are connected in series. Each of these piles of cells extends slightly less than 360° around the inside of the compartment of the B battery casing whereby a vertical space is provided at one side of the battery to house a trigger device to be described in detail at a later point. More specifically, the one end of the upper one of the two cell piles is connected to a wire 41 which constitutes one of the two leads of the B battery. The opposite end of the upper one of the two cell piles is connected by means of a wire 42 to one end of the lower cell pile. The opposite end of this cell pile is connected to a wire 43 which constitutes the second lead of the B battery. Both of the wires extend through the bottom plug 23 in bores which fit the insulation of the wire sufficiently tightly so as to prevent water from leaking into the battery around the wires.

The bottom plug also has a plurality of passageways through it as shown at 44 through which water may be admitted to the inside of the B battery upon the immersion of the assembly. Such immersion permits the water to enter the casing of the B battery, and to rise to the top, submerging both cell piles and thereby activating them. Inasmuch as the B battery is otherwise sealed, an air vent 45 is provided at the top of the battery casing through the upper plug 24 to permit the air inside of the casing to escape as the water enters the passageways.

The B battery operates at a voltage level sufficiently high to cause short circuiting through the water electrolyte with which the B compartment becomes filled after immersion. Thus, means must be provided to expel all water in excess of the amount which is held in the bibulous pads which separate the electrodes. This is accomplished by closing the vent hole 45 by means which are activated only after the water level inside of the casing rises to a point to insure complete saturation of all of the pads within the battery. Four modifications of such means are disclosed herein. Three of the means are operated by a trigger battery, whereas one is of a type which is water activated in the sense that a valve device to seal the vent hole is released upon becoming wetted. Upon activation, the cells through electrochemical action begin to liberate hydrogen gas, which, being entrapped in the casing (vent hole 45 having been closed) develops sufficient pressure to expel the excess water back through the passageway 44, leaving the bibulous pads saturated with electrolyte.

The preferred means for closing the vent hole 45 is disclosed in Figures 2, and 4 to 7. The means employed consist of a dimple motor 46 which is a small cartridge containing an explosive charge adapted to be fired electrically. For this purpose the motor is connected to a water activated trigger battery 47 by means of two leads 48 and 49. The dimple motor resides within a passageway 50 which is open as at 51 to the inside of the battery casing. The passageway 50 extends laterally away from the bottom of the vent hole 45. A resilient washer 52 surrounds the opening of passageway 50 into the casing and provides a seat adapted to receive a ball 53 to close and seal the opening. The ball is affixed to one end of the dimple motor and is disposed so that it seats against the washer 52 to block the vent hole when the end of the cartridge to which it is affixed expands outwardly upon the firing of the cartridge. See Figures 6 and 7. In order to accommodate the dimple motor, the upper plug 24 of the B battery casing is extended by means of a block of plastic material 54 which is affixed to the top of the plug.

The trigger battery 47 which fires the cartridge is contained within a tube 55 which depends from the underside of the top plug 24 into the vertical space provided between the ends of the two cell piles. The bottom of the tube is closed and the upper end is open through apertures such as slits 56 cut through the tube material. The tube may be secured to the upper plug as shown in Figure 6 by being inserted into a circular seat and held therein by a plastic solvent or other adhesive. The slits 56 which are provided near the upper end of the tube permit water to enter into the inside of the trigger battery when the water level inside of the B battery rises to a point level with or slightly above the upper cell pile. In some instances, the immersion of the battery may be uneven so that the trigger battery might become active before all of the bibulous pads of the cells are completely saturated with water. In order to retard the activation of the trigger battery to provide a safety factor, a wad of cotton 57 such as shown in Figure 4 or other wick material may be placed in the top of the trigger battery just inside of the openings 56.

The trigger battery may be constituted by a single cell having a silver chloride positive electrode 58, a magnesium negative electrode 59, a bibulous pad 60, which is sandwiched between the two electrodes, and an additional bibulous pad 61 which is on the other side of the positive electrode. The electrodes are in strip form and are folded together as shown in Figure 5 in order to fit within the tube 55. A magnesium silver chloride battery is preferred to trigger the dimple motor because it produces a very large current immediately after being activated. Thus, there is no wasting delay under short circuiting conditions after the battery is immersed.

In substance, therefore, when the battery assembly is immersed in water, water enters the bottom of the A battery through the inlet 20. This drives the air from the A battery through the vent 19. At the same time, water enters the B battery through the passageway 44 in bottom plug 23 to drive the air out of the cell compartment through the air vent 45. When the water level within the cell compartment of the B battery reaches the apertures 56 near the top of the trigger battery, it flows into the tube 55 saturating the cotton 57 and then in filling the tube it activates the electrodes 58 and 59 which sends a current through wires 48 and 49 to fire the dimple motor. This drives the ball 53 against washer 52 to seal the air vent. The hydrogen gas generated in the cell piles then quickly empties the water from the battery compartment driving it out through the apertures 44 whence it entered.

Figure 8:
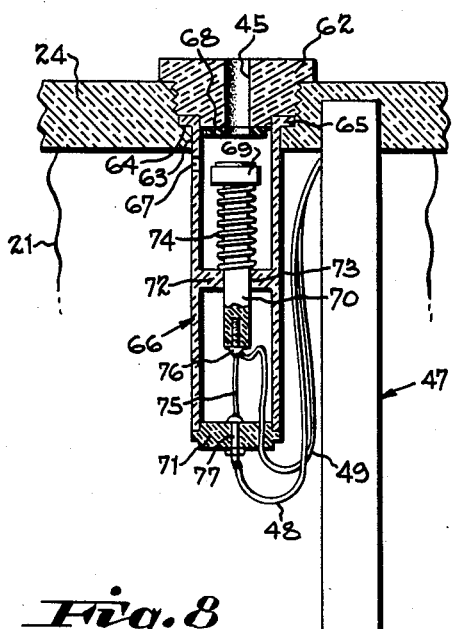
Figure 8 is a fragmentary cross sectional view showing a modified form of the vent closing device, with the vent in open condition.
Figure 9:
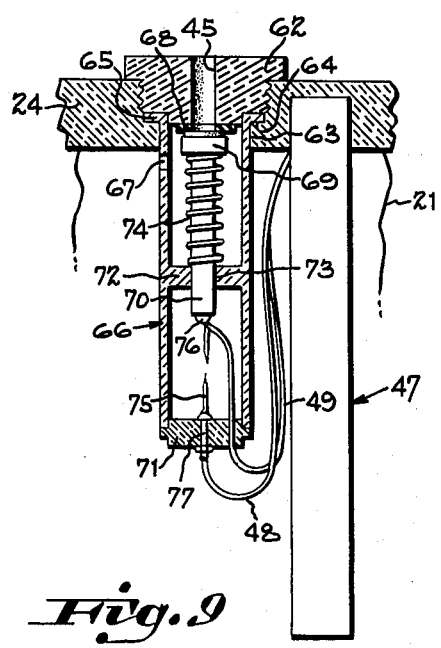
Figure 9 is a view similar to Figure 8 showing the vent closed.

The modification of the vent closing device which is shown in Figures 8 and 9 employs a trigger battery which may be identical to the one described above. In this instance, the air vent hole 45 is provided in a screw plug 62 which threads into the top of the annular plug 24. The threaded bore into which plug 62 screws is concentric to a smaller bore 63 which passes through top plug 24. The juncture of the threaded bore and bore 63 provides an annular shoulder 64 which receives an outwardly turned rim flange 65 formed at the top of a cylindrical tube 66. When the screw plug 62 is tightened into place the rim flange 65 is locked into place. The side wall of tube 66 may have one or more apertures 67 in it to permit air to escape through the upper part of the tube and out vent hole 45. A resilient washer 68 may be applied to the bottom of screw plug 62 surrounding the lower end of vent hole 45. This washer is designed to receive the head 69 of a plunger 70 upon the activation of the trigger battery. The bottom of tube 66 is closed by a flanged disk 71 which is configured to seat the lower rim of the tube, the juncture being sealed by adhesive or an appropriate plastic solvent. The tube has an internal web 72 in which it has a central bore 73 therein to receive the stem of plunger 70. The plunger is biased upwardly toward sealing relationship with the washer 68 by means of a coil spring 74 which surrounds the plunger, being seated at its lower end on the web 72 and being seated at its upper end against the underside of head 69. Plunger 70 normally is held in retracted position by means of a fusible wire 75 which is connected to the lower end of the plunger by means of a small screw 76 to which it is soldered and which is threaded into the plunger. The opposite end of the fusible wire is soldered to a bolt 77 which extends through the disk 71 in the bottom of the tube. The two lead wires 48 and 49 of the trigger battery respectively are attached to the upper end of the fusible wire 75 and the lower end of bolt 77 so that the fusible wire is in direct short-circuit connection with respect to the cell of the battery. Thus, upon activation of the trigger battery, the fusible wire melts and therefore breaks to permit the plunger to be snapped upwardly by spring 74 to close the vent hole.

Figures 11 and 12 show a vent hole closing device which is also water activated, but not electrically. The device is mounted upon the inner wall of one of the two cylinders 21 or 22 by means of a bracket 78 so that it is directly below a vent hole 79 which is formed in the upper plug 24 of the B battery. The underside of the plug is counterturned surrounding the vent hole to provide a valve seat 80. The device consists of a tubular body 81 having a plunger 82 vertically slidably mounted therein. The stem of the plunger projects past the bottom of the tube and has a collar 83 upon it to limit the upper movement of the plunger with respect to the valve body.

The central part of the tubular body of the device has a web therein which is apertured to receive the stem of the plunger. A coil spring 84 seated on top of the web surrounding the stem is under compression between the web and the head 85 of the plunger. The head of the plunger, it will be noted, is in the shape of a frustrum of a cone, tapering upwardly. The upper rim of the tubular body 81 is the same diameter as the bottom of the plunger head. However, the part of the tubular body immediately below the rim tapers inwardly and downwardly as at 86 at substantially the same angle that the conical head tapers upwardly. Thus, when the head is seated on the top of the body, there is a ridge at the juncture of the two which is greater in diameter than the areas of the head and the body immediately above and below the juncture. Normally the plunger is held in cocked position, seated on top of the body 81 by means of a collar 87 which is formed of water-softenable material. The collar clings to the head and to the valve body after being applied so as to sustain the spring under pressure; but, when the battery is immersed, the water-softenable material, becoming soft and limp, (as indicated at 88) releases the head of the plunger and permits the spring to snap the plunger upwardly against the seat 80 to close the vent opening.

The fourth modification of the valve closing device, which is also electrically operated, is shown in Figures 13–15. In this instance the vent closing device and the battery cell are mounted in a single tube 90, the tube being held in place by a screw plug 91, which is tightened down against a rim flange 92 at the top of the tube. The screw plug has a passageway 93 through it which constitutes the air vent opening. The bottom of the tube 90 is closed by means of a flanged disk 94. The aperture to permit entry of water into the cell is in the side of the tube, as at 95, just below the vent closing means. The cell may be constructed like the modification shown in Figures 4 and 5, having two lead wires 96 and 97 which extend from the cell up through the tube to a small squib or explosive cartridge 98, which is secured to the inside of the tube to block the upper part thereof with respect to the slit 95. In this modification the vent hole 93 is adapted to be sealed by means of a cap 99 which is slidably disposed within the tube above the explosive charge 98. The underside of the slidable cap is hollow and seats a coil spring 100 which is normally held under compression between the cap and the squib charge in a depressed position with respect to vent hole 93 by means of a wire 101, the wire connecting the cap to the squib charge. By reference to Figure 15 it will be seen that the tube 90 has a plurality of apertures 102 in it in the area surrounding the cap 99. To permit air to escape past the cap the side wall of the cap has a series of vertical grooves 103, which provides direct passageway for air from the inside of the cell compartment to the vent hole 93. Therefore, when the battery is immersed in water the cell within tube 90 becomes activated by water entering the aperture 95. This causes a current to be generated which fires the squib charge. Wire 101 is soldered to the upper end of the squib 98, as indicated at 104. The solder melts from the heat of the squib when it is fired, thus releasing the wire so that the spring may snap the slidable cap 99 up against the vent hole. To insure a tight seal at the vent hole, a rubber washer 105 is provided which is seated on top of the slidable cap.

Having described our invention, we claim:

1. A battery adapted to be activated by immersion in water, said battery comprising a casing, a plurality of water activable, series-connected electrolytic cells in said casing, bibulous pads associated with said cells, said cells characterized by generating a gas upon being activated, a water inlet in the bottom of said casing to permit water to enter the casing upon the immersion thereof, an air vent in the top of said casing to permit air to escape from said casing upon the immersion thereof, a water activated trigger battery in said casing, and an electrically actuated vent closing device effective upon receiving current from said trigger battery to close said vent, whereby the gas generated by the activated cells forces the free water in said casing which is not absorbed by said bibulous pads out through said inlet whence it entered to prevent such free water from short circuiting the series-connected cells.

2. The battery of claim 1 wherein the positive electrodes are cuprous chloride, the negative electrodes are magnesium, and the bibulous pads are disposed between the positive and negative electrodes of the respective cells.

3. A battery adapted to be activated by immersion in water, said battery comprising a casing, a plurality of water-activable, series-connected electrolytic cells in said casing, bibulous pads associated with said cells, said cells characterized by generating a gas upon being activated, a water inlet at the bottom of said casing to permit water to enter said casing upon immersion thereof, an air vent in the top of said casing to permit air to escape from said casing upon immersion thereof, a water-activated trigger battery in said casing, normally open valve means movable to a position to close said air vent, and an explosive charge in circuit connection with said trigger battery and constructed to fire upon receiving current from said trigger battery and thereby actuate said valve means to said closed position, whereby the gas generated by the activated cells forces the free water in said casing which is not absorbed by said bibulous pads out through said inlet whence it entered upon immersion of said battery, to prevent said free water from short-circuiting the series-connected cells.

4. A battery adapted to be activated by immersion in water, said battery comprising a casing, a plurality of water-activable, series-connected electrolytic cells in said casing, bibulous pads associated with said cells, said cells characterized by generating a gas upon being activated, a water inlet in the bottom of said casing to permit water to enter the casing upon immersion thereof, an air vent in the top of said casing to permit air to escape from said casing upon the immersion thereof, a water-activated trigger battery positioned in said casing at a level generally higher than most of the said cells in said casing whereby the trigger battery is activated by water entering said casing upon immersion after the bibulous pads of most of the said cells in said casing have been wetted with water, and an electrically actuated vent closing device effective upon receiving current from said trigger battery to close said vent, whereby gas generated by the activated cells forces the free water in said casing which is not absorbed by said bibulous pads out through said inlet whence it entered, to prevent such free water from short-circuiting the series-connected cells.

5. A battery adapted to be activated by immersion in water, said battery comprising a hollow, generally cylindrical casing having top and bottom end closures, a plurality of substantially flat, water-activable electrolytic cells disposed in said cylindrical casing in generally radial relationship thereto, bibulous pads associated with said cells, said cells characterized by generating a gas upon being activated, the bottom end closure of said casing having a water inlet to permit water to enter the casing upon immersion thereof, the top end closure of said casing having an air vent to permit air to escape from said casing upon the immersion thereof, a water-activated trigger battery associated with said casing, and an electrically-actuated vent closing device in circuit connection with said trigger battery for actuating said vent closing device to close said vent upon receiving current from said trigger battery whereby the gas generated by the activated cells forces the free water in said casing which is not absorbed by said bibulous pads out through said inlet whence it entered, to prevent such free water from short-circuiting the series-connected cells.

6. A battery adapted to be activated by immersion in water, said battery comprising a hollow casing having top and bottom closures, a plurality of substantially flat, water-activable electrolytic cells disposed in said casing, bibulous pads associated with said cells, said cells characterized by generating a gas upon being activated, the bottom end closure of said casing having a water inlet to permit water to enter the casing upon immersion thereof, the top end closure of said casing having an air vent to permit air to escape from said casing upon the immersion thereof, a water-activated trigger battery associated with said casing, and an electrically-actuated vent closing device in circuit connection with said trigger battery for actuating said vent closing device to close said vent upon receiving current from said trigger battery, whereby the gas generated by the activated cells forces the free water in said casing which is not absorbed by said bibulous pads out through said inlet whence it entered, to prevent such free water from short-circuiting the series-connected cells.

7. A battery adapted to be activated by immersion in water, said battery comprising a casing, a plurality of water-activable cells disposed within said casing, each cell comprising a cuprous chloride positive electrode, a magnesium negative electrode, and a bibulous pad disposed between said electrodes thereof, said cells being in electrical interconnection and being characterized by generating a gas upon being activated, a water inlet in the bottom of said casing to permit water to enter the casing upon immersion thereof, an air vent in the top of said casing to permit air to escape from said casing upon immersion thereof, a water-activated trigger battery associated with said casing so as to be activated substantially in unison with the said cells upon entry of water thereto, and an electrically-actuated vent closing device in circuit connection with said trigger battery and effective upon receiving current from said trigger battery to close said vent, whereby the gas generated by the activated cells forces the free water in said casing which is not absorbed by said bibulous pads out through said inlet whence it entered, to prevent such free water from short-circuiting the series-connected cells.

8. A battery adapted to be activated by immersion in water, said battery comprising a casing, a plurality of electrically interconnected water-activable electrolytic cells in said casing, bibulous pads associated with said cells for holding water in contact with the electrodes of the cells to effect activation thereof, the said cells characterized by generating a gas upon being activated, a normally open water inlet in the bottom of said casing to permit water to enter the casing upon immersion of the battery in water, a normally open air vent in the top of said casing to permit air to escape from the casing upon immersion of the battery in water, a normally open valve movable to a vent closing position, electrical means for moving said valve to vent closing position including a water-actuated trigger battery positioned relative to said cells to be activated upon entry into said casing through said water inlet of an amount of water sufficient to substantially activate said cells whereby the gas generated by the water-activated cells forces free water from said casing through said inlet whence it entered, to prevent such free water from short-circuiting the said cells.

9. A battery adapted to be activated by continuing immersion in water, said battery comprising a tubular casing having top and bottom end closures and means delineating an inner compartment and an outer compartment surrounding the inner compartment, a plurality of water-activable, series-connected electrolytic cells in said outer compartment electrically interconnected to constitute a B battery, at least one water-activable electrolytic cell in said inner compartment constituting an A battery, bibulous pads associated with the electrodes of the batteries in the inner and outer compartments for effecting activation of said batteries thereof upon wetting of said pads with water, the cells in both compartments being characterized by generating a gas upon being activated with water, water inlet means in the bottom of said casing for admitting water to both the inner and outer compartments upon immersion of the battery in water, air vent means at the top of said casing communicating with the inner and outer compartments to permit air to escape therefrom upon immersion of the battery in water, a normally open valve movable to close said vent in the outer compartment, a water-activable trigger battery positioned in said casing for activation upon entry of water into at least said outer compartment sufficiently to substantially activate the batteries therein, and means responsive to activation of said trigger battery for moving said valve to vent closing position.

10. A battery adapted to be activated by immersion in water, said battery comprising a casing having top and bottom closures, a plurality of water-activable, electrically interconnected electrolytic cells in said casing, bibulous pads associated with said cells, said cells characterized by generating a gas upon being activated, the said bottom closure of said casing having a water inlet to permit water to enter said casing and wet said bibulous pads upon immersion of the casing in water, the said top end closure of said casing having an air vent to permit air to escape from said casing upon immersion thereof, normally open valve means associated with said vent and movable to vent closing position, and means for moving said valve to vent closing position including a water-responsive trigger member associated with said casing in position to respond to water entering said casing through said inlet in an amount sufficient to activate substantially all of the said cells therein.

11. A deferred-action battery comprising: a battery cell requiring wetting with fluid to initiate activation and subsequent removal of said fluid therefrom upon substantial activation; a container enclosing said cell and including a gas valve having a vent with a closure mechanism therefor open at about the time of said wetting and including a fluid valve having at least one port for admitting said fluid to displace the gas in said container through said vent and thereby initiate said activation; and means for liberating a fluid-displacing gas in said container upon said substantial activation; said closure mechanism including means responsive in a time corresponding to sufficient displacement of the first-mentioned gas in said container and said substantial activation for closing said vent, whereby said fluid-displacing gas expels said fluid through at least one of said ports and conditions said battery for operation.

12. A deferred-action battery comprising: a battery cell requiring immersion in activating fluid to initiate activation and subsequent removal of said fluid therefrom upon substantial activation; a container enclosing said cell and including an air valve having a vent with a closure mechanism therefor open at about the time of said immersion and including a fluid valve having at least one port for admitting said fluid to displace the air in said container through said vent and thereby initiate said activation; and means for liberating a fluid-displacing gas in said container upon said substantial activation; said closure mechanism including means responsive in a time corresponding to sufficient displacement of the air in said container and said substantial activation for closing said vent, whereby said gas expels said fluid through at least one of said ports and conditions said battery for complete activation.

13. A deferred-action battery comprising: a battery cell requiring wetting with fluid to initiate activation and subsequent removal of said fluid therefrom upon substantial activation; a container enclosing said cell and including a gas valve having a vent with a closure mechanism therefor open at about the time of said wetting and including a fluid valve having at least one port for admitting said fluid to displace the gas in said container through said vent and thereby initiate said activation; and means for liberating a fluid-displacing gas in said container upon said substantial activation; said closure mechanism including means responsive in a time corresponding to sufficient displacement of the first-mentioned gas in said container for closing said vent, whereby said fluid-displacing gas expels said fluid through at least one of said ports and conditions said battery for operation.

14. A deferred-action battery comprising: a plurality of stacked battery cells requiring wetting with fluid to initiate activation and subsequent removal of said fluid therefrom upon substantial activation; and a container enclosing said cells and including a gas valve having a vent with a closure mechanism therefor open at about the time of said wetting and including a fluid valve having at least one port for admitting said fluid to displace the gas in said container through said vent and thereby initiate said activation; said cells being effective to liberate a fluid-displacing gas in said container upon said substantial activation; said closure mechanism including means responsive in a time corresponding to sufficient displacement of the first-mentioned gas in said container and said substantial activation for closing said vent, whereby said fluid-displacing gas expels said fluid through at least one of said ports and conditions said battery for operation.

15. A deferred-action battery comprising: a plurality of battery cells requiring wetting with fluid to initiate activation and subsequent removal of said fluid therefrom upon substantial activation; a container enclosing said cells and including a gas valve having a vent with a closure mechanism therefor open at about the time of said wetting and including a fluid valve having at least one port for admitting said fluid to displace the gas in said container through said vent and thereby initiate said activation; and means including said cells for liberating fluid-displacing gas in said container upon said substantial activation; said closure mechanism including means responsive in a time corresponding to sufficient displacement of the first-mentioned gas in said container and said substantial activation for closing said vent, whereby said fluid-displacing gas expels said fluid through at least one of said ports and conditions said battery for operation.

16. A deferred-action battery comprising: a plurality of battery cells having electrodes and dry interelectrode spacers requiring wetting with fluid to initiate activation and subsequent removal of fluid therefrom upon substantial activation; a container enclosing said cells and including a gas valve having a vent with a closure mechanism therefor open at about the time of said wetting and including a fluid valve having at least one port for admitting said fluid to displace the gas in said container through said vent and thereby initiate said activation; and a fluid-actuated gas generator for liberating a fluid-displacing gas in said container upon said substantial activation; said closure mechanism including means responsive in a time corresponding to sufficient displacement of the first-mentioned gas in said container and said substantial activation for closing said vent, whereby said fluid-displacing gas expels free fluid in said container through at least one of said ports and conditions said battery for operation.

17. A deferred-action battery assembly comprising: a pair of fluid-activated batteries at least one of which requires the removal of fluid therefrom upon substantial activation; a container enclosing said batteries and including a gas valve having a vent with a closure mechanism therefor open at about the time of said wetting and including a fluid valve having at least one port for admitting said fluid to displace the gas in said container through said vent and thereby initiate said activation; and means for liberating a fluid-displacing gas in said container upon said substantial activation; said closure mechanism including means responsive in a time corresponding to sufficient displacement of the first-mentioned gas in said container and said substantial activation for closing said vent, whereby said fluid-displacing gas expels said fluid through at least one of said ports and conditions said one battery for operation.

18. A deferred-action battery assembly comprising: a pair of fluid-activated batteries at least one of which liberates gases when wet with fluid; a pair of containers individually enclosing said batteries and individually having an air vent and having a port for admitting fluid to the container to displace air therein and initiate battery activation; and a closure mechanism for the air vent of the container for said gas-liberating battery, said mechanism being open at about the time of said wetting and responsive in a time corresponding to sufficient displacement of said air and substantial activation of the other of said batteries for obstructing said last-mentioned air vent, whereby said liberated gases expel said fluid admitted through the port of said last-mentioned container and condition said one battery therein for complete activation.

References Cited in the file of this patent

UNITED STATES PATENTS

| | | |
|---|---|---|
| 481,664 | Engledue | Aug. 30, 1892 |
| 2,322,210 | Adams | June 22, 1943 |
| 2,594,879 | Davis | Apr. 29, 1952 |
| 2,639,306 | Fischbach | May 19, 1953 |
| 2,640,091 | Pucher et al. | May 26, 1953 |